Oct. 5, 1954  G. B. THOMAS  2,690,672
INERTIAL MARKING DEVICE FOR SUBSURFACE INSTRUMENTS
Filed April 15, 1949  4 Sheets-Sheet 1
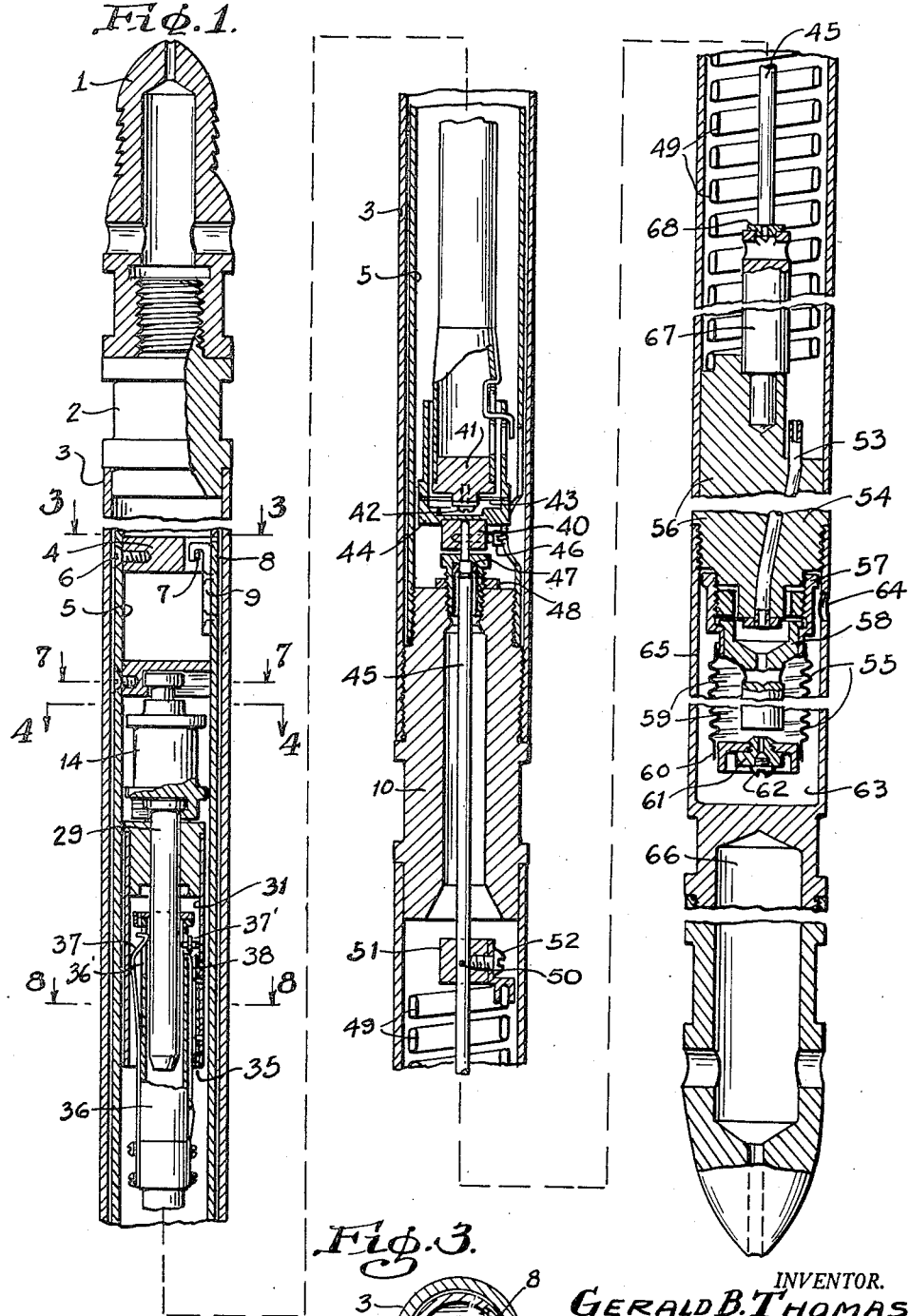
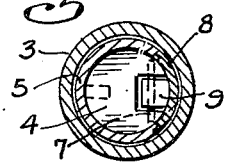
INVENTOR.
GERALD B. THOMAS
BY
ATTORNEY.

Oct. 5, 1954  G. B. THOMAS  2,690,672
INERTIAL MARKING DEVICE FOR SUBSURFACE INSTRUMENTS
Filed April 15, 1949  4 Sheets-Sheet 2
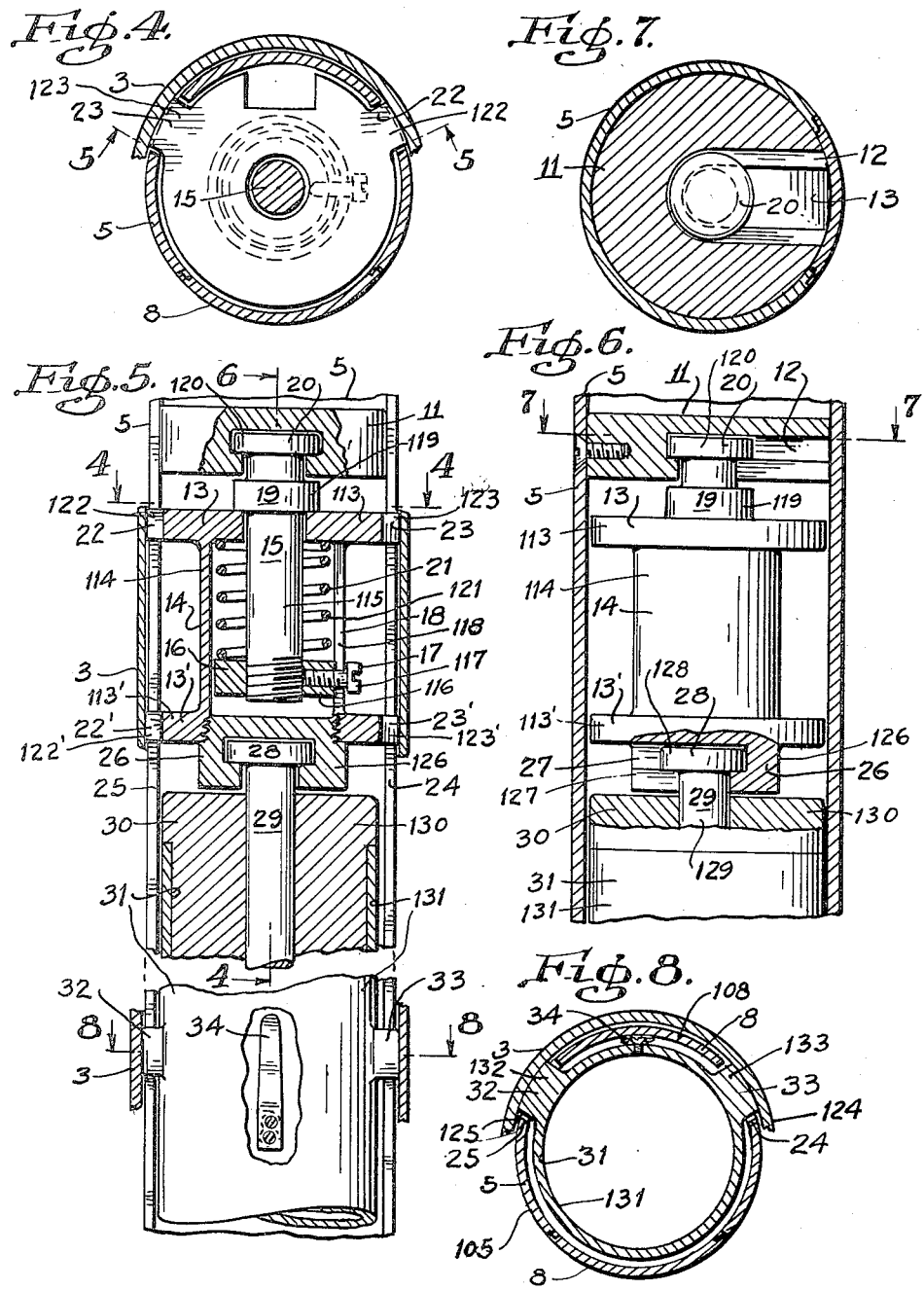
INVENTOR.
GERALD B. THOMAS
BY
ATTORNEY.

Oct. 5, 1954  G. B. THOMAS  2,690,672
INERTIAL MARKING DEVICE FOR SUBSURFACE INSTRUMENTS
Filed April 15, 1949  4 Sheets-Sheet 3
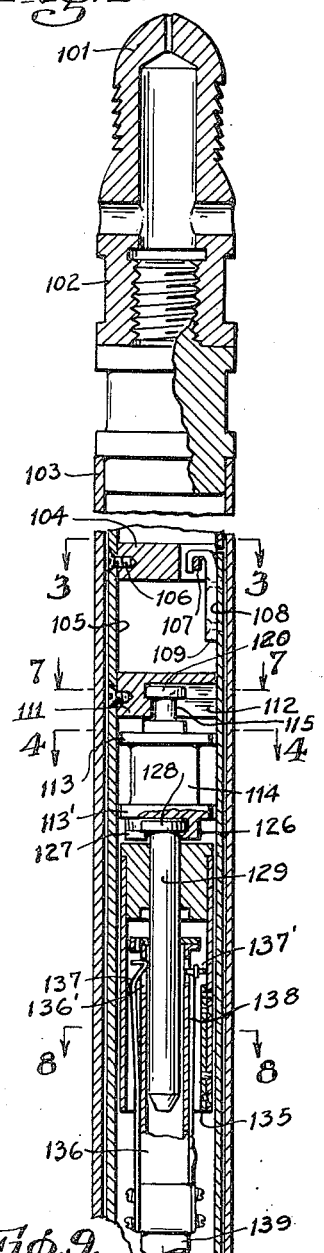
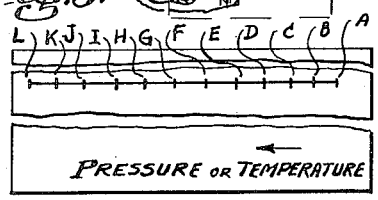
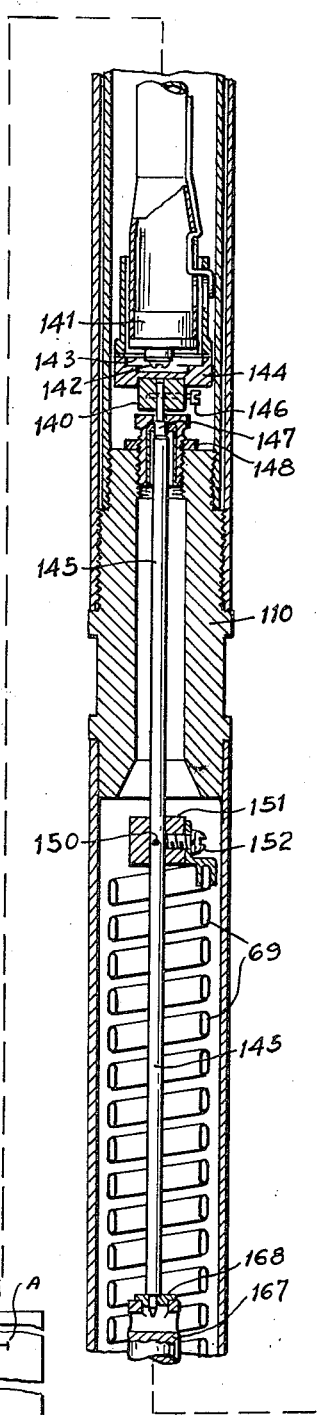
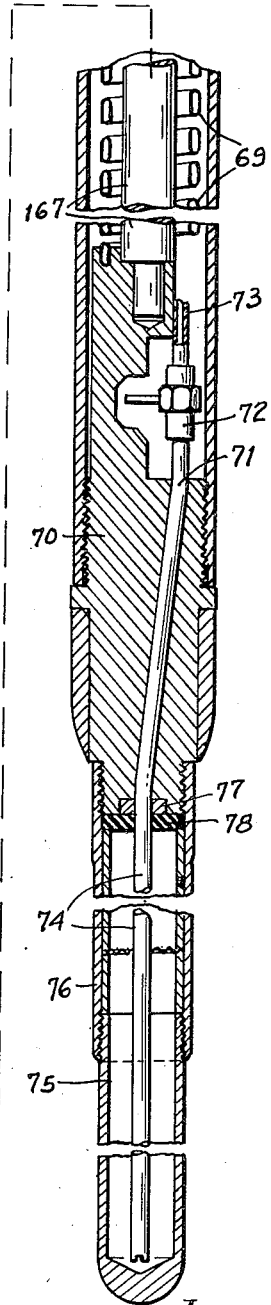
INVENTOR.
GERALD B. THOMAS
BY Philip Sublow
ATTORNEY.

Oct. 5, 1954 G. B. THOMAS 2,690,672
INERTIAL MARKING DEVICE FOR SUBSURFACE INSTRUMENTS
Filed April 15, 1949 4 Sheets-Sheet 4

INVENTOR.
GERALD B. THOMAS
BY
ATTORNEY.

Patented Oct. 5, 1954

2,690,672

UNITED STATES PATENT OFFICE 2,690,672

INERTIAL MARKING DEVICE FOR SUBSURFACE INSTRUMENTS

Gerald B. Thomas, Los Angeles, Calif., assignor to Signal Oil and Gas Company, Los Angeles, Calif., a corporation of Delaware Application April 15, 1949, Serial No. 87,613

7 Claims. (Cl. 73—300)

This application is a continuation-in-part of Serial No. 72,450, filed January 24, 1949.

This invention relates to devices for performing surveys in bore holes drilled into the earth, and more particularly in bore holes extended for the production of petroleum or gas from the earth.

As is generally known, it is common practice to determine the physical characteristics of the bore hole and of the earth's environment by lowering an instrument into the bore. Such instrument may measure pressure, temperature, radio-activity, densities of the fluid in the bore hole, rate of flow of fluid in the bore hole, the point of entrance of fluid, such as gas or water, or the geographical position of the bore hole, or may be used for the purpose of obtaining other information. These instruments may be of the single shot variety which are lowered to a known depth in the bore hole and recovered from such depth, a single record being made at one depth. They may be of the traverse type, i. e., whereby they are lowered into the bore hole, and the characteristics recorded at varying depths, but in all such cases the record obtained must be correlated with depth.

The object of my invention is to devise an instrument which will be self-contained and which will produce a recognizable mark on the record of the physical characteristics made by the instrument and which mark may be correlated with depth.

In the prior art, the recognition of the depth in the traverse type of instrument in which any record of the measured physical characteristic and its variation with depth is made by recording this variation as a function of time of traverse of the instrument. By recording simultaneously time and the measured characteristic, a trace is obtainable which is a function of both time and the characteristic. The time function is obtained usually by means of a clock which is set in motion as the instrument is let into the well. Time is also recorded at the surface as is, also the depth by means of measuring the length of line passed out in lowering the instrument, said length being correlated with the time interval of the lowering process. Thus, knowing the depth obtained at any time interval of the lowering, the same interval may be read from the trace and the magnitude of the characteristic recorded and such time interval on the instrument is readable from the record.

In this procedure there is always an interval of time between the starting of the clock and the start of the lowering process. This is occasioned by the fact that the instrument must be in partly disassembled condition when the clock is started. Then the instrument is assembled and introduced into the well, adjustments made, and the lowering started. Time is kept at the surface of the duration of this procedure and a correction must be made by measuring back on the record the recorded time, and, by interpolation on the record, determining the value of the recorded characteristics at the corrected time corresponding to the depth recorded at the surface for such time.

Additionally, temperature in bore holes increases with depth, and the driving mechanism connecting the clock and recording mechanism is affected by such temperature and introduces an important error in the recordation of the time function in the instrument. In other words, the clock record in the instrument is out of step with the clock record at the surface so that it cannot be said with certainty that the interval of time recorded by the clock in the instrument is the same as that recorded by the clock at the surface.

In order to avoid such uncertainties, it is often the practice to stop the descent of the instrument for a recorded period of time at successive depths the value of which is known from surface measurements. Where the characteristics recorded change progressively with depth, the stopping of the instrument at a known depth for a short time will produce a plateau in which such characteristics do not change with time. This will permit of a check on the depth measurement and of a correlation and correction of clock timing with depth. This procedure has the disadvantage that it introduces an undesirable delay in the traverse.

In another method the instrument is lowered to a series of depths, measured by recording the amount of lowered line, and allowed to come to rest at each depth so that equilibrium is established. No effort is made to take the measurements between such depths. In other words, the clock merely acts to cause an advance of the chart so that a trace can be made. The chart between the stopping point is ignored, and since the number of stops made and the corresponding depth at each succeeding stop is known, the actual depth at each plateau is known and the magnitude of the recorded characteristic at each plateau may be measured from the chart.

It will be recognized that in order to make a determinable plateau, a significant time interval must be allowed at each stop. This makes it impracticable, especially in deep bores, to make the interval between stops small so that frequently significant variations of the characteristics between stops are missed.

The correlation method has the difficulty arising from the indeterminacy of the effect of temperature on the clock mechanism or, in the case of pressure measurement, on the pressure recordation, and in the case of the step method the value of the characteristics between the stops is not obtained.

There is another difficulty with this step method in the failure to record the characteristics as a continuous variable of the depth or time, arising from the appreciable interval between stops which practical considerations require. Frequently it is essential to obtain immediate results of the traverse and to obtain a continuous record of the variable characteristics. This is illustrated by the use of thermometric (temperature) traverses to obtain the location of the top of the cement in bore hole cementing operations. Thus, when cementing, it is important to know the location before the cement is set so that if it is at an insufficient height additional cement may be introduced to raise the cement level. The thermometric survey indicates the top of the cement by the substantial temperature change resulting from the heat of setting of the cement. If the clock method of recording depth is used and a continuous traverse is made, the thermal lag may give an inaccurate trace and the time of computing correction factors for the clock mechanism operation may be so long as to make this method impracticable. When using the step method there is the danger that the top of the cement (whose position is unknown) will be missed.

In addition to these operational difficulties in clock actuated mechanisms for actuating the chart so that a line is scribed on the chart which is a function of both time and the other variable to be measured in the bore hole, the structural and instrumental complications and expense incident to the use of a clock constitutes a disadvantage. Such clocks must be specially constructed and are quite expensive. The instrument must be elongated to provide space for the clock and the driving mechanism connecting the clock and the chart.

I have devised a mechanism for the recordation of any variable whose value changes with depth in one direction in a progressive and continous manner, as, for example, sub-surface pressure and temperatures in an oil well, in which a line or plurality of marks are made on a chart, which marks or lines are determined solely by the single variable being measured. I, independently thereof, employ a mechanism which is controllable from the surface for introducing a second mark on the same record. Since I may make this second mark periodically and at will and may do so by manipulations at the surface, I may correlate this second mark with time measured at the surface or with depth, i. e., length of line payed out in lowering the instrument from the surface. I may thus, by associating the second mark with the first mark, identify the time or depth at which any of the first marks have been made.

In a preferred embodiment of my invention I introduce an inertially operated device which actuates a recording mechanism. In my preferred embodiment, I employ a resiliently suspended mass, which mass may be the instrument or a portion thereof or a separately suspended mass. By suddenly stopping, accelerating or decelerating the descent of the instrument, the variation in acceleration actuates the inertial device so as to make a mark. Since I may so stop, accelerate, or decelerate the device as frequently as I wish and since the interval of descent during such stoppage, acceleration or deceleration may be as short as desired or even reduced to zero, i. e., by stopping the instrument, I may make as many such marks as I wish and thus obtain an accurate record of the variations of the characteristics with depth and, of course, record the depth, i. e., length of payed out line at each point of such acceleration or deceleration.

Summarizing my invention, I have devised a sub-surface instrument for recording sub-surface measurements, of any variable of said bore hole or shaft which changes in one direction as a function of depth, which instrument includes an element which is responsive to said variable, a chart, a marking device, the relative position of said chart and marking device being responsive to the magnitude of said variable only to make a record which is related to the value of said variable at the sub-surface position of said instrument and is not related to depth or time, and includes also an inertially actuated device actuable from the surface for making an independent mark on said chart which independent mark is correlatable with depth or time.

These and other objects of my invention will be understood from the further description of the preferred embodiment of my invention taken together with the drawings, in which Fig. 1 is a vertical section of a pressure recording gage employing my invention;

Fig. 2 is a vertical section of a temperature recording gage employing my invention;

Fig. 3 is a section taken on line 3—3 of Figs. 1 and 2;

Fig. 4 is taken on line 4—4 of Figs. 1, 2, and 5;

Fig. 5 is taken on line 5—5 of Fig. 4;

Fig. 6 is taken on line 6—6 of Fig. 5;

Fig. 7 is taken on line 7—7 of Figs. 1, 2, and 6;

Fig. 8 is taken on line 8—8 of Figs. 1, 2, and 5;

Fig. 9 is a chart such as recorded by the instrument of Figs. 1-8, inclusive;

Figure 10:
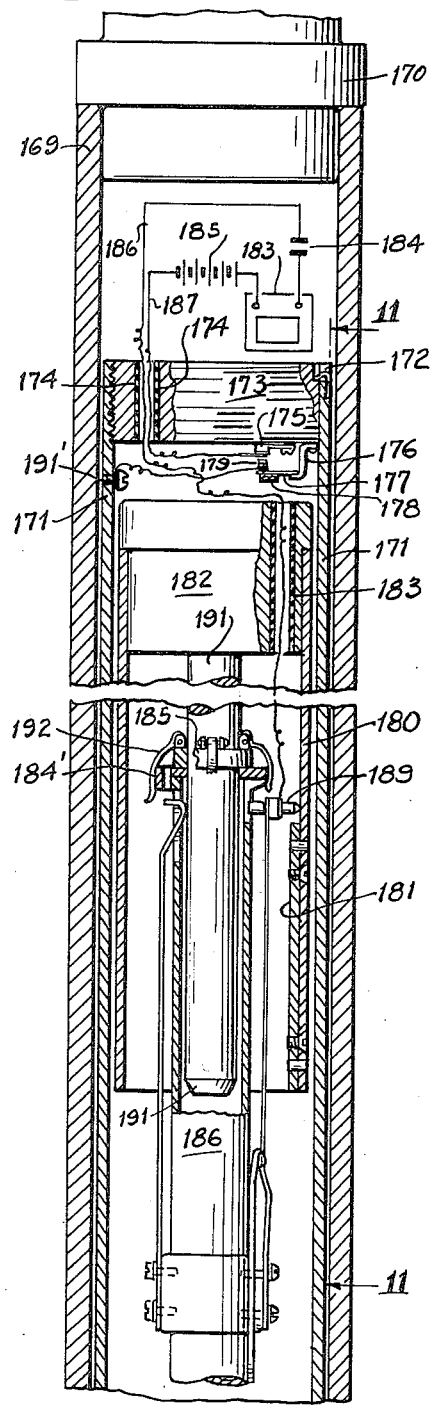
Fig. 10 shows a modification of the inertially actuated device for installation in the instrument of Figs. 1-8, inclusive, suitably modified.

In Fig. 1, the end piece 1 is attached to the lowering line and is mounted upon the housing cap 2 which in turn is removably connected to the outer housing 3. The inner housing 5, having an end closure 4 held in place by means of screw 6, carries a cover latch pin 7. A cover 8 carries a cover snap latch 9 engaging cover latch pin 7. The cover is so positioned with respect to housing 5 as to provide slots between the housing 5 and the longitudinal edges of the cover 8. Mounted in inner housing 5 is a bridge member 11 held in position by screws. The bridge member 11 has a T slot 12. An inertial unit is formed of a cylinder 14 closed by end plates 13 and 13'. The rod 15 passes through a bore in the plate 13 and carries a block 16 which is held by screw 17 slidably positioned in slot 18 in the cylinder 14. The upper end of the rod 15 carries a shoulder 19 and a cylindrical T block 20. A spring 21 is positioned inside the cylinder 14 between the underneath side of the plate 13 and the upper face of the block 16. Plate 13 has two ears 22 and 23 and the plate 13' has two ears 22' and 23' which enter into the slots 24 and 25. Plate 13' is closed by a plug 26 in which there is a T slot 27 into which the T block 28 of the rod 29 passes. Rod 29 passes through the block 30 by means of a sweat or driving fit. The block 30 forms the top cover of the chart holder 31. The chart holder 31 has ears 32 and 33 which pass through the slots 25 and 24, respectively, and carries at its lower end a spring 34 which presses against the interior of the cover 8 to hold it in place. The interior of the cylindrical chart holder has a chart retaining means 35 adapted to hold a piece of paper or the recording means, as will be indicated below.

The rod 29 acts as a stylus arm guide and enters into the tubular stylus arm 36 to center the guide, which centering is also aided by the centering spring 37 mounted on the stylus arm guide 36, and presses against the rod 29 through slot 36' positioned in the stylus arm 36. The stylus 37' is mounted on spring 38 positioned on the stylus arm. The plug 41 is mounted on the spring washer 43 by means of screw 42. The spring washer 43 is mounted on the stylus arm support 44. The stylus arm support 44 is clamped to the stylus shaft 45 by means of clamp 40 and screw 46 and passes through a central bore in the coupling element 10. The stylus shaft 45 is rotatably mounted in jewel 47 which is held in place by the lock nut 48. The lower end of the shaft 45 is rotatably mounted in an end bearing 68 positioned in the bearing support 67 mounted in the element 56.

A coiled Bourdon tube 49 is clamped at the top end thereof to the shaft 45 by means of screw 52 in collar 51. The collar is connected to the shaft 45 by the pin 50. The lower end of the tube is connected to pressure tube 53 passing through element base 54. The tube 53 is in turn connected to the interior of pressure responsive diaphragm or bellows 55 which is mounted upon element base 56 by means of gaskets 57 and a bellows adapter 58, the interior of the bellows forming a fluid pressure chamber having a bellows spacer 59. The lower end of the bellows 60 is closed with a filler plug 61 and screw 62. The bellows is filled with a fluid which is employed to transmit the pressure. Surrounding the bellows and connected to the element base 56 is an oil trap 63 having at its upper end a vent 64. An exterior housing 65 encloses the pressure unit. At the end of the oil trap 63 may be a container 66 in which a thermometer may be mounted if desired.

The device previously described is a pressure bomb or pressure measuring device. A similar construction may be employed for a temperature responsive device, i. e., a recording thermometer.

In Fig. 2, the end piece 101 is attached to the lowering line and is mounted upon the housing cap 102 which in turn is removably connected to the outer housing 103. The inner housing 105 having an end closure 104 held in place by means of screw 106 carries a cover latch pin 107. A cover 108 carries a cover snap latch 109 engaging cover latch pin 107. The cover is so positioned with respect to housing 105 as to provide slots 124 and 125 between the housing 105 and the longitudinal edges of the cover 108 (see Figs. 4, 5, and 8). Mounted in inner housing 105 is a bridge member 111 held in position by screws. The bridge member 111 has a T slot 112. An inertial unit is formed of a cylinder 114 closed by end plates 113 and 113'. The rod 115 passes through a bore in the plate 113 and carries a block 116 which is held by screw 117 slidably positioned in slot 113 in the cylinder 114. The upper end of the rod 115 carries a shoulder 119 and a cylindrical T block 120. A spring 121 is positioned inside the cylinder 114 between the underneath side of the plate 113 and the upper face of the block 116. Plate 113 has two ears 122 and 123 and the plate 113' has two ears 122' and 123' which enter into the slots 124 and 125. Plate 113 is closed by a plug 126 in which there is a T slot 127 into which the T block 128 of the rod 129 passes. Rod 129 passes through the block 130 by means of a sweat or driving fit. The block 130 forms the top cover of the chart holder 131. The chart holder 131 has ears 132 and 133 which pass through the slots 125 and 124, respectively, and carries at its lower end a spring 134 which presses against the interior of the cover 108 to hold it in place. The interior of the cylindrical chart holder has a chart retaining means 135 adapted to hold a piece of paper or the recording means, as will be indicated below.

The rod 129 acts as a stylus arm guide and enters into the tubular stylus arm 136 to center the guide, which centering is also aided by the centering spring 137 mounted on the stylus arm guide 136, and presses against the rod 129 through slot 136' positioned in the stylus arm 136. The stylus 137' is mounted on spring 138 positioned on the stylus arm lift 139. The plug 141 is mounted on the spring washer 143 by means of screw 142. The spring washer 143 is mounted on the stylus arm support 144. The stylus arm support 144 is clamped to the stylus shaft 145 by means of clamp 140 and screw 146 and passes through a central bore in the coupling element 110. The stylus shaft 145 is rotatably mounted in jewel 147 which is held in place by the lock nut 148. This portion of the device of Fig. 2 is identical in construction to the similar portion of Fig. 1.

The stylus shaft 145 passes through the bore in the housing coupling 110 and is pivotally mounted upon the shaft support 167 upon the stylus shaft bearing 168. The stylus bearing support 167 is mounted upon the element base 70. The pressure coil 69 in the form of a flat flexible tubular helical coil enclosed in the housing 79 is connected at one end to the collar 151 by means of screw 152 and the collar is mounted on shaft 145 connecting pin 150. The other end of the coil is connected to the pressure tube 71 which is connected through an intermediary of tube connector 72 having a closable tube 73 to the pressure tube 74 passing through the element base 70 and projecting into the bulb 75. The bulb 75 is mounted upon the element base 70 by means of sleeve 76, housing 77, and the insulating gasket 78.

It will be observed that in both the devices of Figs. 1 and 2 by unscrewing the outer housing 3 and 103, respectively, from the base element 10 and 110, respectively, the housing may be withdrawn and the cover 8 and 108, respectively, may then be unlatched and withdrawn. The inertial element 14 (or 114) may then be withdrawn through the opening, the slot 27 (or 127) riding off the key 28 (or 128) and the slot 12 (or 112) riding off the T 20 (or 120). The housing 5 (or 105) may then be unscrewed from the element base 10 (or 110) and withdrawn. The chart carrier 31 (or 131) may then be withdrawn by lifting the slide 29 (or 129) out of the tube 36 (or 136). A chart such as shown in Fig. 9 may then be mounted on the inside of the tube by mounting it in the chart carrier 35 (or 135). The chart carrier may then be reinserted and the housing 5 (or 105) screwed onto the element 10 (or 110) and the inertial element slid into place, as shown in Figs. 1 and 2. The cover plate 8 (or 108) is in place and the outer housing 3 screwed in.

In Fig. 1 the imposition of pressure in port 64 causes the bellows 55 to contract exerting a pressure through the tube 53 into the interior of the flexible helical tube 49. The coil is thus caused to unwind and in unwinding rotates the stylus shaft 45 causing the stylus support 44 to rotate, thus rotating the stylus arm 36 and causing the stylus 37 to move circumferentially over the chart in position on the chart holder 37. In like manner, the temperature of the bore hole surrounding the instrument, where the instrument of Fig. 2 is employed, creates vapor pressure in the bulb 75 proportional to the temperature, a suitable fluid being used as is conventional in such thermometers, and this pressure is transmitted through tube 74 and tube 71 to the helical coil 69, which thus is caused to unwind rotating the shaft 145 and the stylus in the same manner as in the case of the device of Fig. 1.

It will be observed that as either the device of Fig. 1 or Fig. 2 is lowered and as the temperature increases progressively or as the pressure increases progressively, the degree of rotation of the stylus arm will be directly proportional to the temperature or pressure. Since the chart holder has no vertical motion, the line generated will be a circumferential line which when the chart is removed from the chart holder and opened up appears as a straight line. This line will not permit the correlation of temperature or pressure with depth, and to do so a further record of the depth must be superimposed on the chart.

It will be observed that the chart holder 37 (or 137) is resiliently mounted upon the inertial element 14 (or 114). If therefore the descent of the instrument is suddenly checked the inertia of the descent in the mechanism below the top plate 13 (or 113) of the inertial unit 14 (or 114) will cause the spring to be depressed and when the deceleration is stopped the spring 21 (or 121) will rebound, thus causing the chart to make an oscillation or jog in the record. This may be done by either suddenly stopping the descent or suddenly bouncing the unit by putting a sudden upward pull on the lowering line or suddenly stopping the descent or ascent of the unit. The jogs will appear as shown by A to L in Fig. 9. By keeping a record of the time or of the length of line payed out at the surface for each jog, these times and depths may be correlated with the jogs A to L on the chart. It will thus be possible to record the pressure or temperature at each of the jogs A to L, and these may be plotted, if desired, on ordinary cross section paper.

Figure 11:
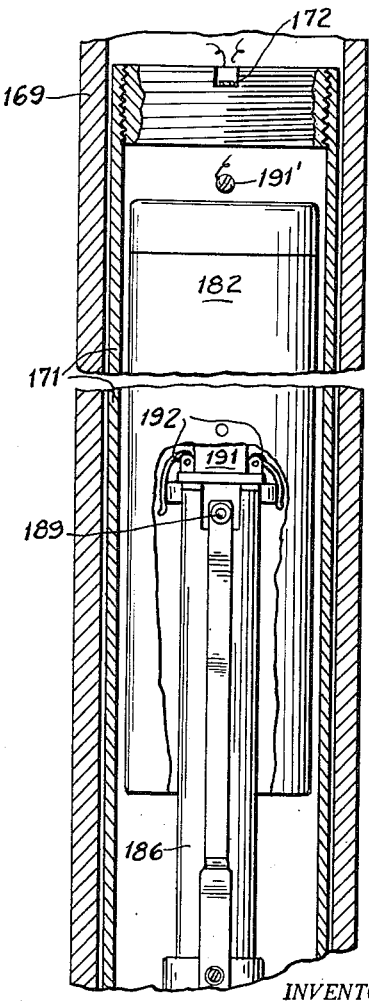
Fig. 11 is taken on line 11—11 of Fig. 10 with parts broken away.

Figs. 10 and 11 show a modification of the inertial marking device of both Figs. 1 and 2 in which the inertial device is electrical instead of mechanical.

The fragment shown in Fig. 10 is the device shown in Figs. 1 and 2, all of the parts being similar to the same parts in Figs. 1 and 2. The change is in the following features. The housing 169 is the same as the housing 3 and 103, and the end cover 170 is the same as 2 or 102. Inside the housing 169 is the inner housing 171 which is similar to the housing 5 or 105. It is closed, however, with a cover 173 through which an insulated bore 174 passes. It carries a latch 172 on which the cover 170 (similar to cover 8 or 108) is placed.

The chart holder is similarly constructed but the top 182, which is similar to top of chart holder 37 (or 137), provided with an insulated bore 183. It carries, as does the chart holder 37, a chart clamp 181, similar to 35 or 135. The chart holder guide 191 is similar to the chart holder guide 29 or 129, with the following modification. The chart holder guide 191 has a shoulder 185 which rests on top 184' of the chart holder guide 186 which is similar to the chart holder guide 36 or 136. It is held in place by clamping springs 192 through which it may be pushed into position. Mounted underneath the closure plate 173 is a contact 175 and a bracket 176. A spring 177 is mounted on the bracket 176. A weight 178 and an insulated contact 179 is mounted on the spring 176 in coaction with the contact 175. An electrical conduit 187 is connected to the contact 175 and passes through the bushing 174 and connected to a small battery 185 and a buzzer 183 and condenser 184 suitably mounted in the space between 170 and 173. The battery and condenser are shown schematically. The other plate of the condenser 184 is connected by means of an electrical conduit 186 passing through the insulated bushing 184 and is connected to the insulated stylus 189. The other contact 179 is connected to housing 171 by a screw 191'.

The operation of this device will be apparent from what has been said before. By suddenly accelerating, decelerating or stopping the unit or jogging it, the spring 177 is caused to vibrate and make and break contact between 179 and 175. This causes a spark to jump between the stylus point 189 and the chart holder 180, causing the spark to puncture the paper which is inserted to receive the record, making the mark in the appropriate place on the line in the place of the marks A to L, inclusive, of Fig. 9.

While I have described a particular embodiment of my invention for the purpose of illustration, it should be understood that various modifications and adaptations thereof may be made within the spirit of the invention as set forth in the appended claims.

I claim:

1. A subsurface bore hole instrument, comprising a case adapted to be lowered into a bore hole, a bore hole condition responsive device in said case responsive to a condition in the bore hole, a recording means in said case comprising a chart-mounting for carrying a chart and a stylus element in marking relation to said chart, an operative connection between one of said elements and said condition responsive device for moving said elements relative to each other, a reciprocable resilient suspending means for the other of said elements, a fixed mounting for said suspending means fixedly positioned in said case, said resilient suspending means being independent of said operative connection, said resiliently suspended element reciprocating in a direction transverse to the direction of the aforementioned motion of said elements relative to each other, and means communicating with the surface for selectively effecting reciprocation of the resiliently suspended element.

2. A subsurface bore hole instrument comprising, a case adapted to be lowered into a bore hole, a bore hole condition responsive device in said case, said device being responsive to a varying condition in the bore hole, a cylindrical chart holder for carrying a chart, a chart holder support rigidly connected to said case, a resilient suspension between said chart holder and said support, a recording stylus, a rotation transmitting connection, between said stylus and said device, for moving said stylus in marking relation with said chart circumferentially of said cylindrical chart holder, and means communicating with the surface for selectively effecting reciprocation of said chart holder on its resilient suspension.

3. A subsurface bore hole pressure gage, comprising a case adapted to be lowered into a bore hole, a fluid pressure chamber in said case, a flexible fluid pressure transmitting tube connected to said fluid pressure chamber, a cylindrical chart holder in said case for carrying a chart, a fixed support in said case, rigidly connected to said case, a resilient suspension between said chart holder and said support, a marking stylus in marking relation with said chart, a rotation transmitting connection, between said fluid pressure transmitting tube and said stylus, for moving said stylus circumferentially over said cylindrical chart holder, and means communicating with the surface for selectively effecting reciprocation of said chart holder on its resilient suspension.

4. A subsurface bore hole instrument comprising, a case to be lowered into a bore hole, a bore hole condition responsive device in said case responsive to a condition in said bore hole, a recording means positioned in said case, said recording means including a stylus and a holder for carrying a chart in marking relation to said stylus, a chart holder mounting rigidly connected to said case, means positioned in said case and operatively connected to said condition responsive device for moving said chart holder and stylus relative to each other, said motion forming a mark on said chart which is a record of the condition as determined by said condition responsive device, separate selectively operable means contained within said case and cooperating with said recording means to effect a distinctive marking on said chart, and means communicating with the surface for controlling the actuation of said selectively operable means, said selectively operable means being thereby operatively controlled from the surface to provide a correlation with said condition.

5. A subsurface bore hole instrument comprising, a case adapted to be lowered into a bore hole, a bore hole condition responsive device in said case responsive to a varying condition in the bore hole, a recording means in said case comprising a chart holder element for carrying a chart and a stylus element in marking relation to said chart, a chart holder mounting rigidly connected to said case, an operative connection between said stylus and said condition responsive device for moving said stylus in a horizontal direction, means for vertically and resiliently suspending said chart holder on said mounting, and means communicating with the surface for selectively effecting reciprocation of the resiliently suspended chart holder.

6. A subsurface bore hole instrument, comprising a case adapted to be lowered into a bore hole, a bore hole condition responsive device in said case responsive to a condition in the bore hole which changes with depth, a recording stylus operatively connected to said condition responsive device and responsive thereto, a mounting rigidly connected to said case for carrying a chart in marking relation to said stylus, selectively operable means independent of said condition responsive device contained within said case and cooperating with said recording means to effect a distinctive marking of said chart, and communicating means extending to the surface for controlling the actuation of said selectively operable means, said selectively operable means being thereby operatively controlled from the surface to enable a correlation of said condition with depth.

7. A subsurface bore hole instrument, comprising a case adapted to be lowered into a bore hole, a bore hole condition responsive device in said case responsive to a condition in the bore hole, a recording means positioned in said case, said recording means including a stylus element and a chart holder element, a chart holder mounting rigidly connected to said case, an operative connection between said condition responsive device and said recording means for moving said elements with respect to each other in a horizontally extending line responsive to said condition, independent means separate from the said condition responsive device for moving said stylus and chart holder relative to each other in a vertical direction to effect a distinctive marking of said chart, said independent means including a motion transmitting means connected to the said recording means for effecting said relatively vertical motion, and means communicating with the surface for controlling and selectively actuating said independent means to provide a correlation with said condition.

References Cited in the file of this patent

UNITED STATES PATENTS

| Number | Name | Date |
| --- | --- | --- |
| 1,837,222 | Kannenstine | Dec. 22, 1931 |
| 1,946,575 | Dunn et al. | Feb. 13, 1934 |
| 1,955,855 | Marx | Apr. 24, 1934 |
| 2,078,623 | Wilde, Jr. | Apr. 27, 1937 |
| 2,184,689 | Savitz | Dec. 26, 1939 |
| 2,223,786 | Hugel | Dec. 3, 1940 |
| 2,265,098 | Bettes | Dec. 2, 1941 |
| 2,593,285 | Fay et al. | Apr. 15, 1952 |